US012698996B2

(12) United States Patent
Arnold et al.

(10) Patent No.: US 12,698,996 B2
(45) Date of Patent: Aug. 4, 2026

(54) PRODUCT DISTRIBUTION DEVICE WITH SECTION CONTROL MONITORING

(71) Applicant: DEERE & COMPANY, Moline, IL (US)

(72) Inventors: Matthew David Arnold, Moline, IL (US); William Douglas Graham, East Moline, IL (US); Michael Eugene Frasier, Iowa City, IA (US)

(73) Assignee: DEERE & COMPANY, Moline, IL (US)

( * ) Notice: Subject to any disclaimer, the term of this patent is extended or adjusted under 35 U.S.C. 154(b) by 618 days.

(21) Appl. No.: 17/700,443

(22) Filed: Mar. 21, 2022

(65) Prior Publication Data

US 2022/0214201 A1     Jul. 7, 2022

Related U.S. Application Data

(63) Continuation of application No. 14/711,840, filed on May 14, 2015, now abandoned.

(51) Int. Cl.
| | |
|---|---|
| *G01F 11/00* | (2006.01) |
| *A01C 7/08* | (2006.01) |
| *A01C 7/12* | (2006.01) |
| *G01F 11/24* | (2006.01) |

(52) U.S. Cl.
CPC ............ *G01F 11/003* (2013.01); *A01C 7/088* (2013.01); *A01C 7/124* (2013.01); *G01F 11/24* (2013.01); *A01C 7/082* (2013.01); *Y02P 60/00* (2015.11)

(58) Field of Classification Search
CPC .... A01C 1/20; G01F 11/003; Y10T 137/8242
See application file for complete search history.

(56) References Cited

U.S. PATENT DOCUMENTS

| | | | | |
|---|---|---|---|---|
| 4,161,659 A | * | 7/1979 | Jacob | H03K 17/9505 |
| | | | | 335/207 |
| 4,255,906 A | * | 3/1981 | Hockett | B24C 3/06 |
| | | | | 451/92 |
| 4,313,475 A | * | 2/1982 | Wiggins | B05B 12/14 |
| | | | | 141/192 |
| 4,458,609 A | * | 7/1984 | Tofte | F28D 7/103 |
| | | | | 62/48.1 |
| 4,637,547 A | * | 1/1987 | Hiniker | B05B 12/00 |
| | | | | 239/69 |

(Continued)

*Primary Examiner* — Joseph A Greenlund
(74) *Attorney, Agent, or Firm* — Michael Best & Friedrich LLP

(57) ABSTRACT

A product distribution device includes a container for holding a product to be distributed, a meter assembly for controlling discharge of product from the container, and a flow control system. The flow control system includes a control member that is movable between an open position and a closed position. A position sensor directly senses the position of the control member. A controller coupled to the flow control system and to the position sensor sends signals to the flow control system to command an open or closed position of the control member and receives signals from the position sensor indicating the position of the control member. The controller compares the sensed control member position with the commanded control member position and alerts an operator when the commanded control member position and the sensed control member position are inconsistent. An enclosure isolates the position sensor from the product.

14 Claims, 9 Drawing Sheets

(56)                References Cited

U.S. PATENT DOCUMENTS

| | | | | |
|---|---|---|---|---|
| 4,684,062 | A * | 8/1987 | Bagwell | E01C 19/174 |
| | | | | 91/275 |
| 4,768,548 | A * | 9/1988 | Maurer | G05D 16/2086 |
| | | | | 137/487.5 |
| 4,967,792 | A * | 11/1990 | Magee | F16K 37/0041 |
| | | | | 137/554 |
| 5,139,044 | A * | 8/1992 | Otten | A01G 25/16 |
| | | | | 239/69 |
| 5,246,164 | A * | 9/1993 | McCann | A01G 25/16 |
| | | | | 239/11 |
| 5,878,679 | A * | 3/1999 | Gregor | A01C 15/04 |
| | | | | 111/178 |
| 6,213,698 | B1 | 4/2001 | Cosenza | |
| 6,368,046 | B1 * | 4/2002 | Burnett | F15B 11/05 |
| | | | | 239/677 |
| 6,418,948 | B1 * | 7/2002 | Harmon | B28C 5/468 |
| | | | | 134/198 |
| 6,945,509 | B2 * | 9/2005 | Royse | A01G 25/16 |
| | | | | 137/554 |
| 7,044,444 | B2 * | 5/2006 | Haubold | F15B 15/2807 |
| | | | | 137/554 |
| 7,156,121 | B2 * | 1/2007 | Cox | F16K 37/0041 |
| | | | | 137/15.01 |
| 7,328,719 | B2 * | 2/2008 | Madden | F16K 37/0041 |
| | | | | 137/557 |
| 7,555,990 | B2 * | 7/2009 | Beaujot | A01C 21/005 |
| | | | | 111/175 |
| 7,690,440 | B2 | 4/2010 | Dean et al. | |
| 8,132,521 | B2 | 3/2012 | Snipes et al. | |
| 8,196,534 | B2 | 6/2012 | Meyer et al. | |
| 8,281,724 | B2 * | 10/2012 | Snipes | A01C 7/124 |
| | | | | 111/178 |
| 8,678,347 | B2 * | 3/2014 | Maro | A01C 7/081 |
| | | | | 251/129.15 |
| 9,097,247 | B1 * | 8/2015 | Cushing | F04B 49/065 |
| 9,562,623 | B2 * | 2/2017 | Clark | F16K 37/0041 |
| 10,227,969 | B1 * | 3/2019 | Cushing | F04B 47/02 |
| 2003/0201338 | A1 * | 10/2003 | Greene | B05B 13/041 |
| | | | | 239/1 |
| 2007/0034264 | A1 * | 2/2007 | Kunz | F16K 31/042 |
| | | | | 137/554 |
| 2008/0092960 | A1 * | 4/2008 | Manecke | F16K 37/0033 |
| | | | | 137/554 |
| 2010/0307394 | A1 * | 12/2010 | Snipes | A01C 7/127 |
| | | | | 111/11 |
| 2010/0307395 | A1 * | 12/2010 | Snipes | A01C 7/102 |
| | | | | 111/11 |
| 2011/0290332 | A1 * | 12/2011 | Soldo | F16K 37/0033 |
| | | | | 137/15.01 |
| 2012/0067258 | A1 * | 3/2012 | Maro | F15B 15/00 |
| | | | | 111/11 |
| 2013/0153676 | A1 * | 6/2013 | Ballu | A01C 23/047 |
| | | | | 239/11 |
| 2013/0206258 | A1 * | 8/2013 | Duboy | G01D 11/245 |
| | | | | 137/553 |
| 2013/0314239 | A1 * | 11/2013 | Clark | E03B 7/08 |
| | | | | 340/686.1 |
| 2014/0076992 | A1 * | 3/2014 | Cooper | B05B 9/0413 |
| | | | | 239/73 |
| 2014/0131469 | A1 * | 5/2014 | Henry | A01C 23/007 |
| | | | | 239/176 |
| 2014/0263708 | A1 * | 9/2014 | Thompson | A01C 23/007 |
| | | | | 239/11 |
| 2014/0263709 | A1 * | 9/2014 | Kocer | B05B 1/3006 |
| | | | | 239/11 |
| 2016/0330901 | A1 * | 11/2016 | Arnold | G01F 11/24 |
| 2016/0339282 | A1 * | 11/2016 | Melton | A62C 35/68 |

* cited by examiner

PRODUCT DISTRIBUTION DEVICE WITH SECTION CONTROL MONITORING

CROSS-REFERENCE TO RELATED APPLICATIONS

This application is a continuation of U.S. patent application Ser. No. 14/711,840, filed on May 14, 2015, the entire content of which is incorporated by reference herein.

FIELD

The following relates to a product distribution device, such as an agricultural air seeder, having section control and a monitor for the section control.

DETAILED DESCRIPTION

A product distribution device is provided and described below. One application of such a device is an agricultural air seeder.

Figure 1:
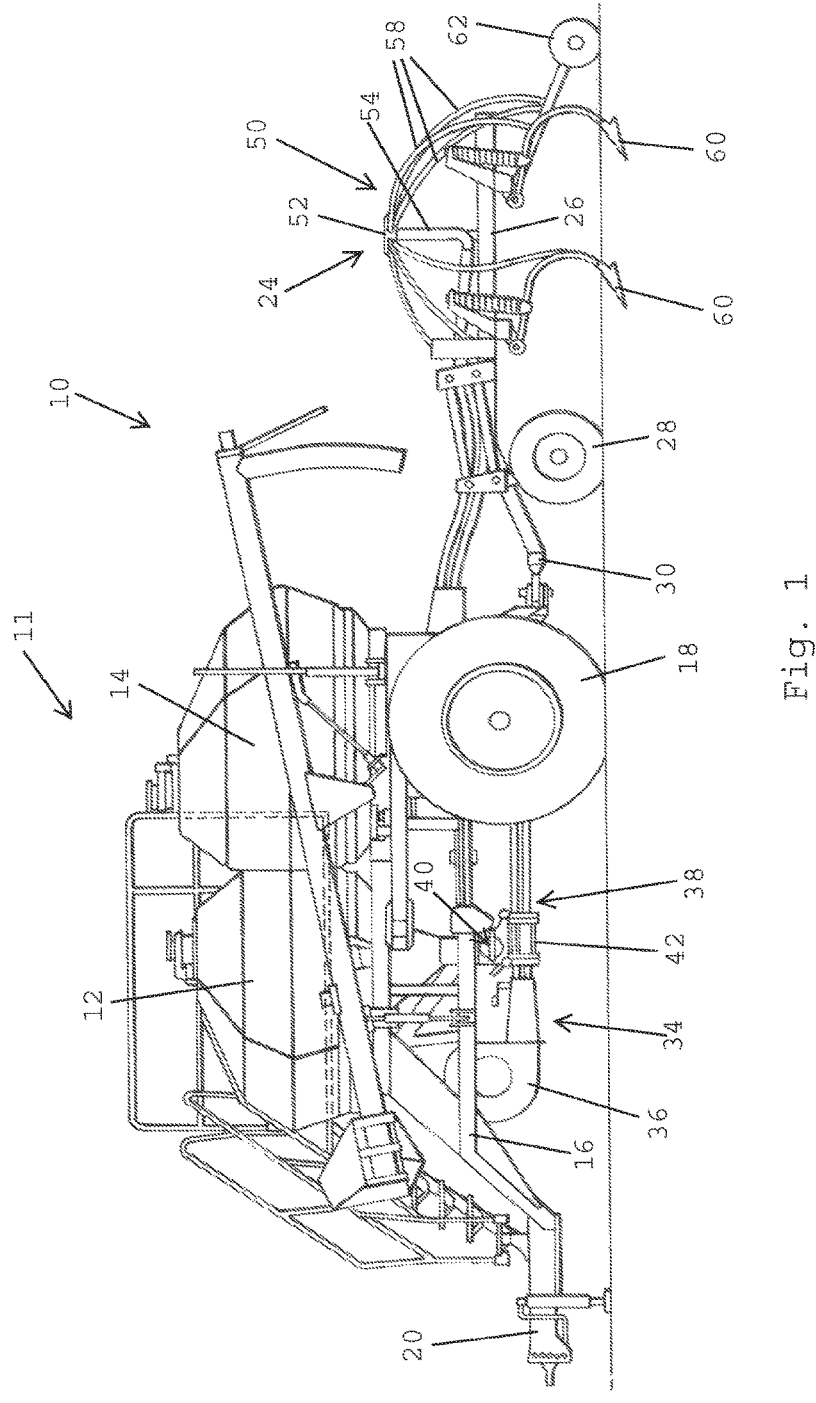
FIG. 1 is a side elevational view of an air seeder and tilling implement.

Referring to FIG. 1 an agricultural seeding and fertilizing implement 10 commonly referred to as an air seeder is shown. Implement 10 includes an air cart 11 having containers or tanks 12 and 14 for containing products to be distributed to the soil. The tanks 12 and 14 are mounted on a frame 16 supported by ground wheels 18 for forward movement over the ground by a towing vehicle (not shown) connected to a forward tongue 20. Any number of tanks can be provided on the air cart. A ground-engaging tool 24 includes a frame 26 supported by ground wheels 28 and is connected to the rear of the air cart frame 16 by a tongue 30. Alternative arrangements may place the ground engaging implement in front of the air cart 11 or the air cart and the ground engaging tool can be combined onto a common frame. The tanks 12 and 14 can be any suitable device for holding the material to be dispensed. They could be hoppers, bins, boxes, containers, etc. The term "tank" shall be broadly construed herein. Furthermore, one tank with multiple compartments can also be provided.

An air distribution system 34 includes a fan 36 connected and a product delivery conduit structure having multiple product flow passages 38. The fan 36 directs air through the passages 38. A product meter assembly 40, located at the bottom of each tank 12 and 14, only one of which is shown in FIG. 1, delivers the products from the tanks 12 and 14 to a primary manifold 42. In the manifold 42, the product enters into the passages 38 and the stream of air moving through the passages 38. As will be described below, there are multiple passages 38, each associated with one section of the meter. The particular type of meter is not important to the product distribution device, however, in most instances, the meter will be a volumetric meter. An example of such a distribution device is the John Deere 1910 Commodity Air Cart which is shown in detail in U.S. Pat. No. 6,213,698, incorporated herein by reference.

Each passage 38 carries product rearwardly in the air stream to a secondary distribution tower 50. Typically, there will be one tower 50 for each passage 38. Each tower 50 includes a secondary distributing manifold 52 located at the uppermost end of a vertical tube 54. The distributing manifold 52 divides the flow of product into a number of secondary distribution lines 58. Each secondary distribution line 58 delivers product to one of a plurality of openers 60 attached to the frame 26 at transversely spaced locations to deposit the product in the ground. A firming or closing wheel 62 associated with each opener 60 trails the opener and firms the soil over the product deposited in the soil. The implement 10 may be equipped with separate passages 38 for each of the tanks 12 and 14 as shown whereby different products can be distributed separately. Alternatively, the products from tanks 12 and 14 can be combined in the same set of passages 38 for distribution together. In other embodiments of the distribution system, the passages 38 may be selectively configurable to combine the products from tanks 12 and 14 into common passages or to keep the products separate in different passages 38. In the air cart 11 shown in FIG. 1, the manifold 42 is configurable to direct product into either an upper rank of passages 38 or into a lower rank of passages 38. The manifold 42 of the tank 14 is likewise configurable to mix or keep separate the products from the two tanks.

The meter assembly 40 will now be described in greater detail with reference to FIGS. 2-6. Meter assembly 40 includes a meter housing 70 having an upper end 72 that is coupled to the lower end of the product tank 12. The housing 70 further has a lower end 74 that is coupled to the primary manifold 42 of the pneumatic distribution system. The housing 70 has an inlet passage 78 through which product is received into the housing and an outlet passage 80 through which metered product is delivered to the distribution system. A rotary cut off valve 82 is placed in the inlet passage 78 and can be rotated as shown by the arrow 83 from the open position shown in FIG. 6 to a cleanout position in which product is discharged from the housing 70 to enable the product tank 12 to be emptied without the product flowing through the meter assembly to the distribution system.

Figure 2:
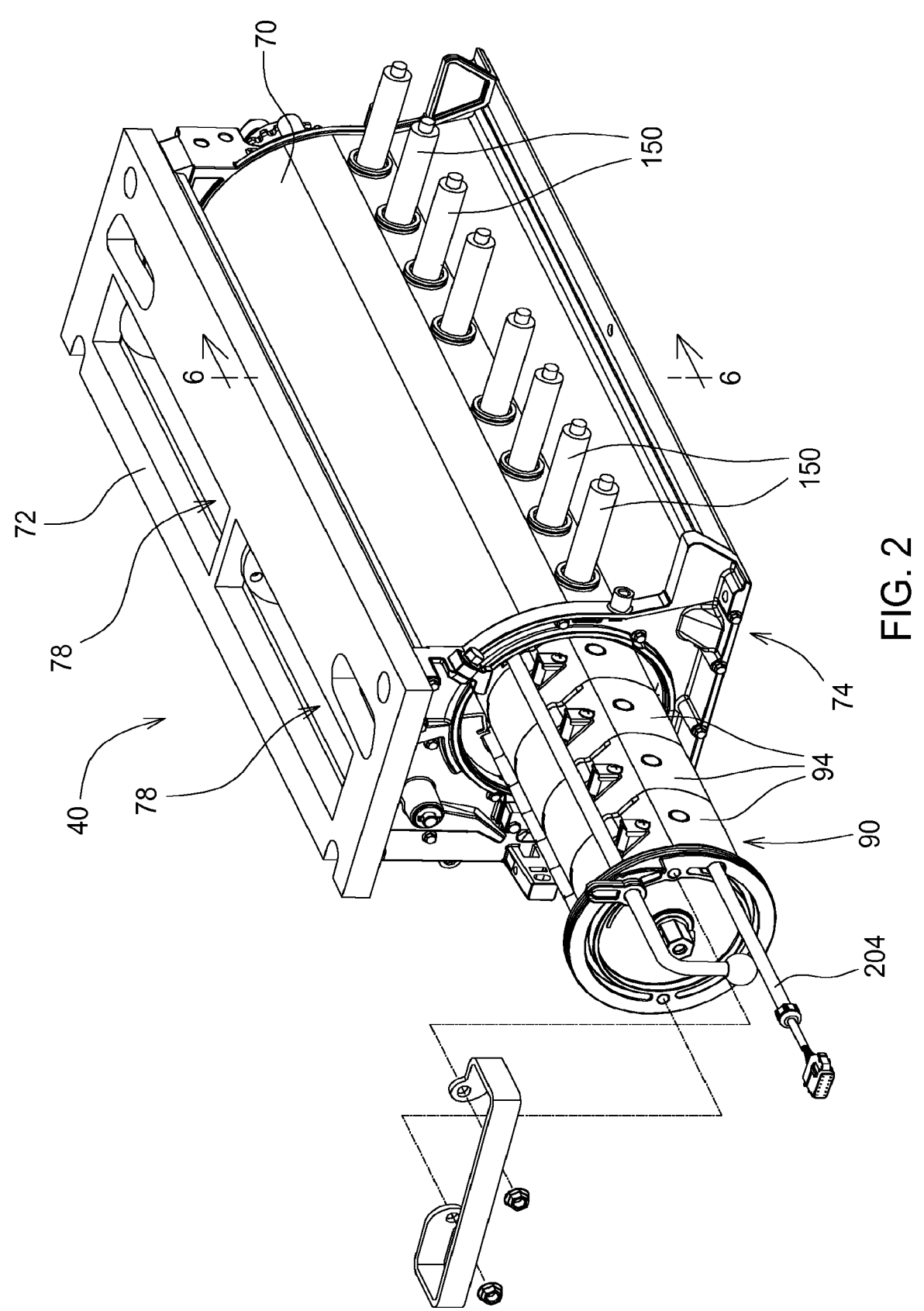
FIG. 2 is a perspective view of the seed meter shown in FIG. 1.
Figure 3:
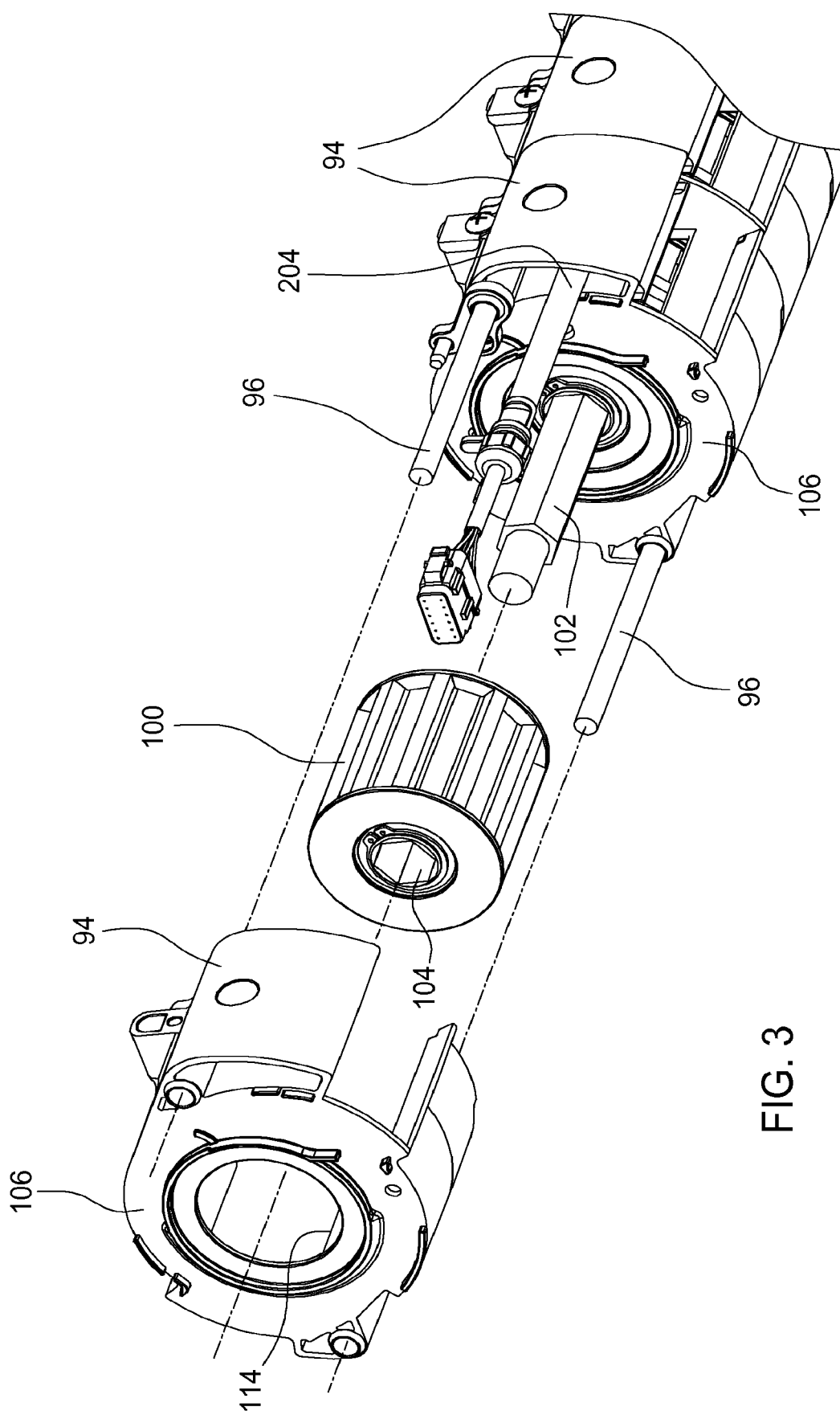
FIG. 3 is an exploded perspective view of the meter cartridge illustrating one meter casing and one roller segment separated from the cartridge.

The inlet passage 78 leads to a meter cartridge 90 which houses a meter roller 92. The cartridge 90 is removable from the meter housing 70 as shown in FIG. 2 where the cartridge 90 is shown partially withdrawn from the meter housing 70. The cartridge 90 consists of a plurality of meter casings 94 placed adjacent to one another and fastened together by elongated bolts 96, FIG. 3, extending through apertures 98 in the meter casings. The meter roller 92 is constructed of a plurality of roller segments 100 axially positioned along a drive shaft 102. In the embodiment shown, the drive shaft 102 is hex shaped to mate with the hex shaped bore 104 in the roller segments 100. Additional attaching hardware is shown and described in U.S. Pat. No. 5,878,679 incorporated herein by reference.

Each roller segment 100 is disposed within a separate meter casing 94. Each meter casing 94 has a radial wall 106 along one axial end of the casing 94 that separates adjacent roller segments 100 from one another axially along the shaft 102. Each casing 94 defines an inlet 108 in communication with and aligned with the inlet passage 78 of the meter housing 70 for receiving product therefrom. As the meter roller 92 rotates, as shown by the arrow 110 in FIG. 6, product is displaced by the teeth and grooves 112 of the rollers, over the ledge 114 to the outlet 116 in the meter casing. Product flow over ledge 114 only occurs when the shut-off gate 140 is in an open position as described below. From the meter cartridge outlet 116 product flows to the outlet passage 80 in the meter housing and to the manifold 42 of the distribution system 34.

Figure 7:
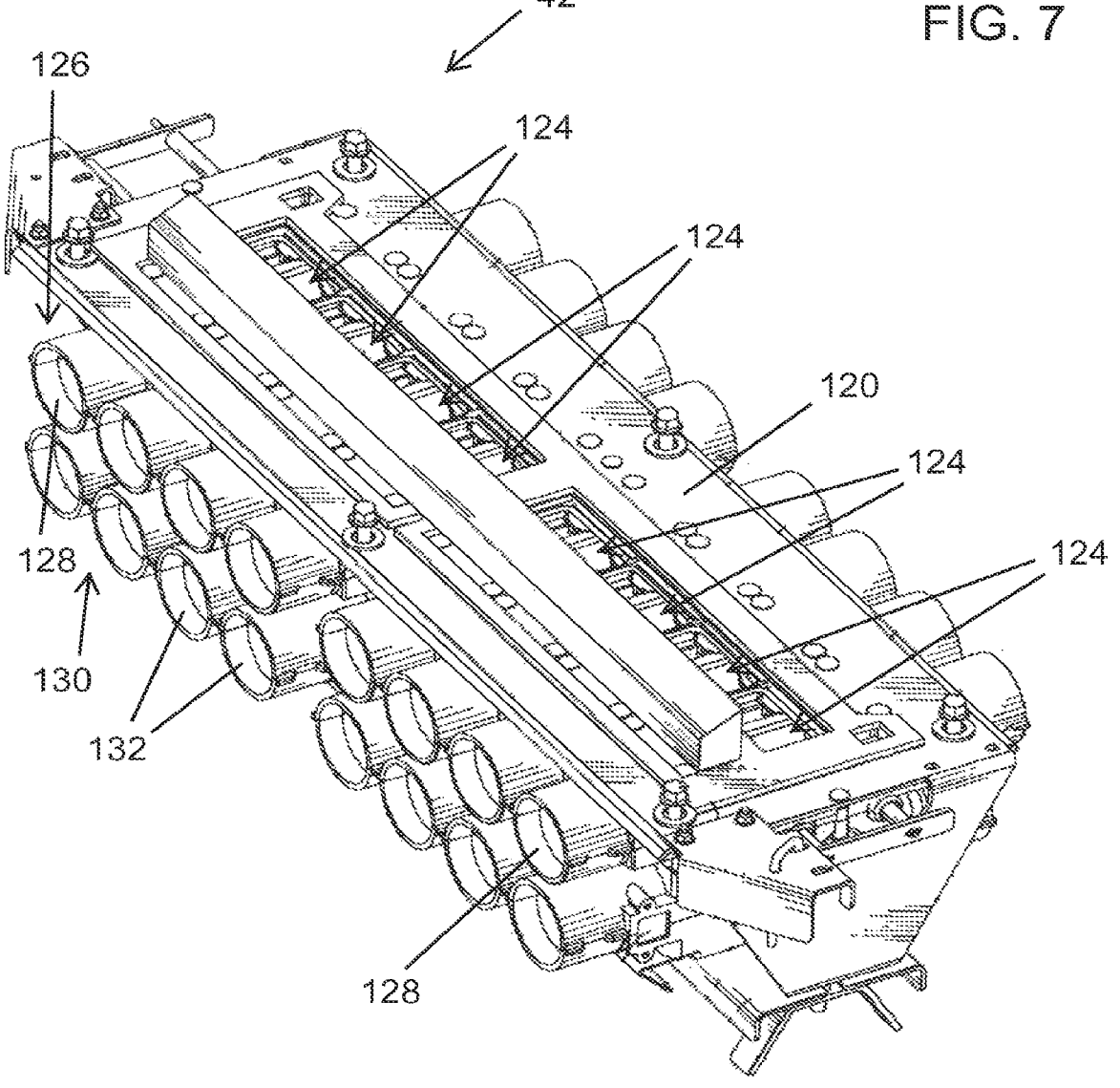
FIG. 7 is a perspective view of the primary distribution manifold.
Figure 8:
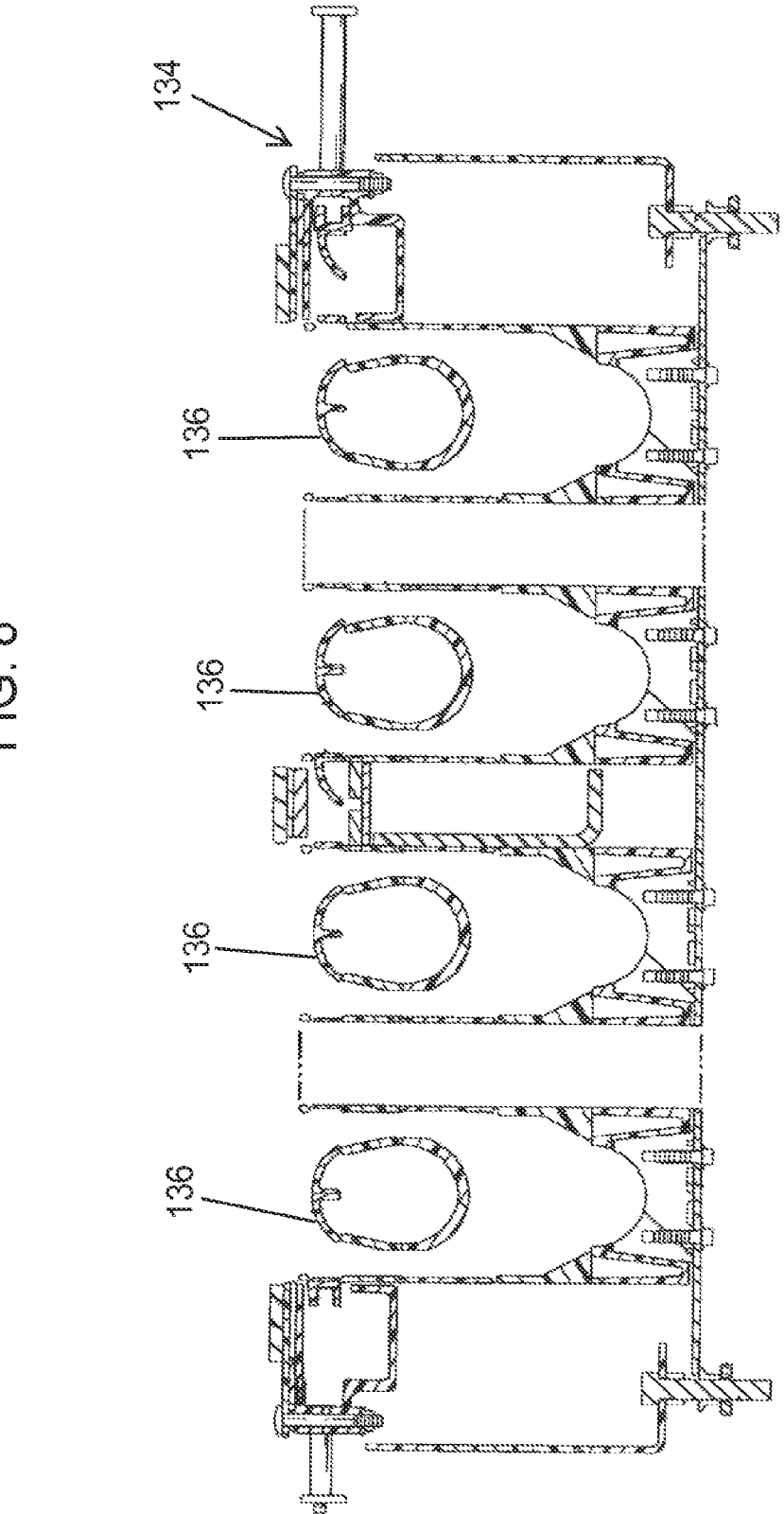
FIG. 8 is a sectional view of the primary distribution manifold of FIG. 7.
Figure 9:
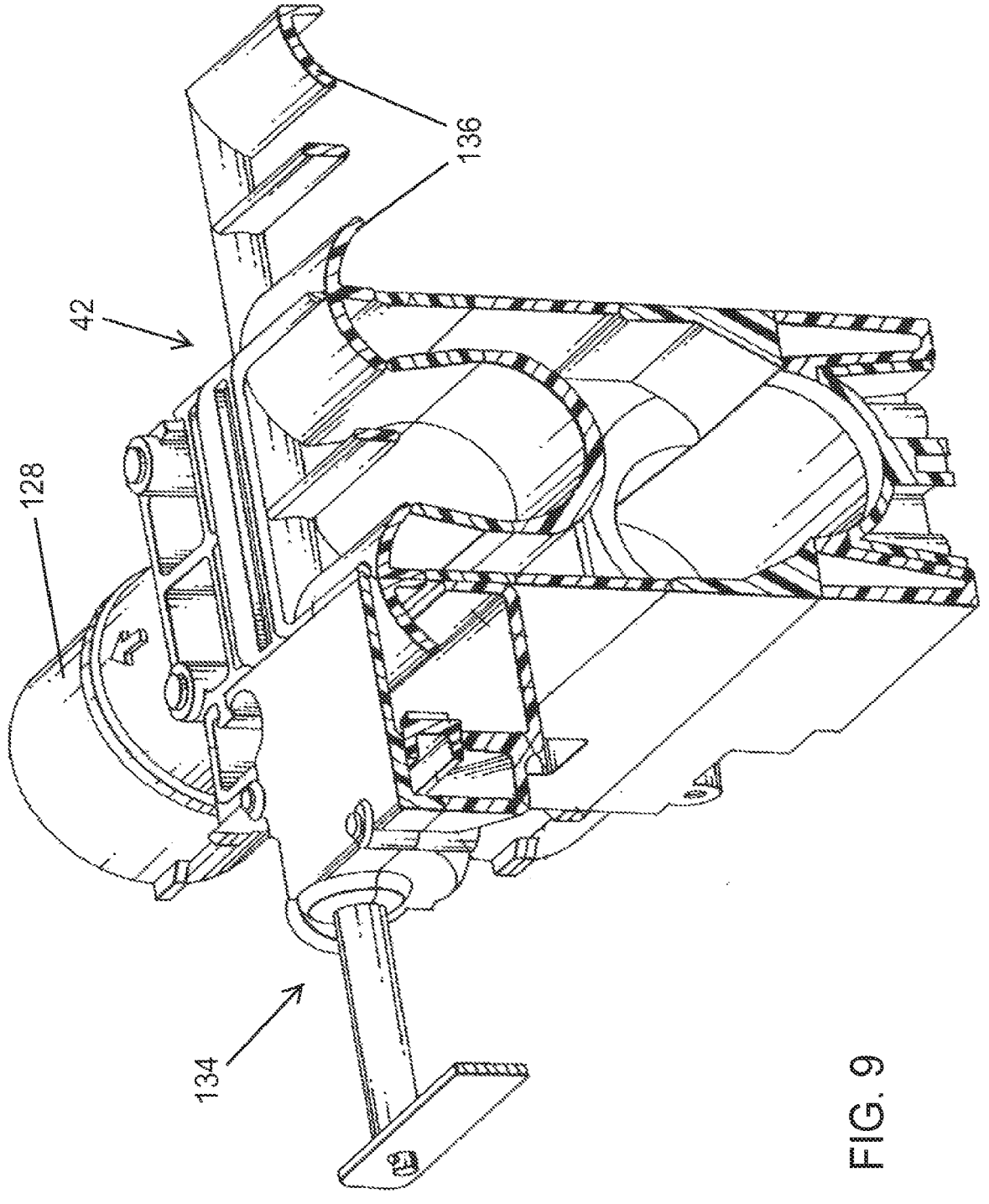
FIG. 9 is a fragmentary sectional perspective view of a portion of the distribution manifold of FIG. 7.

With reference to FIGS. 7-9, the manifold 42 has an upper end 120 which is fastened to the lower end 74 of the meter housing 70. The manifold has eight cavities 124 at the upper end that align with the eight cavities 84 of the outlet passage 80 in the meter housing. The manifold 42 has an upper rank 126 of tubes 128 that connect to an upper rank of the product flow passages 38. The manifold further has a lower rank 130 of tubes 132 that connect to a lower rank of passages 38. An adjustable valve 134 is slidable in the manifold and has convex valve members 136 that direct the product to either the upper rank or the lower rank of tubes. The valve 134 is shown in one position in FIG. 8 directing the product to the lower rank 130 of tubes and in the opposite position in FIG. 9 directing the product to the upper tubes.

Figure 4:
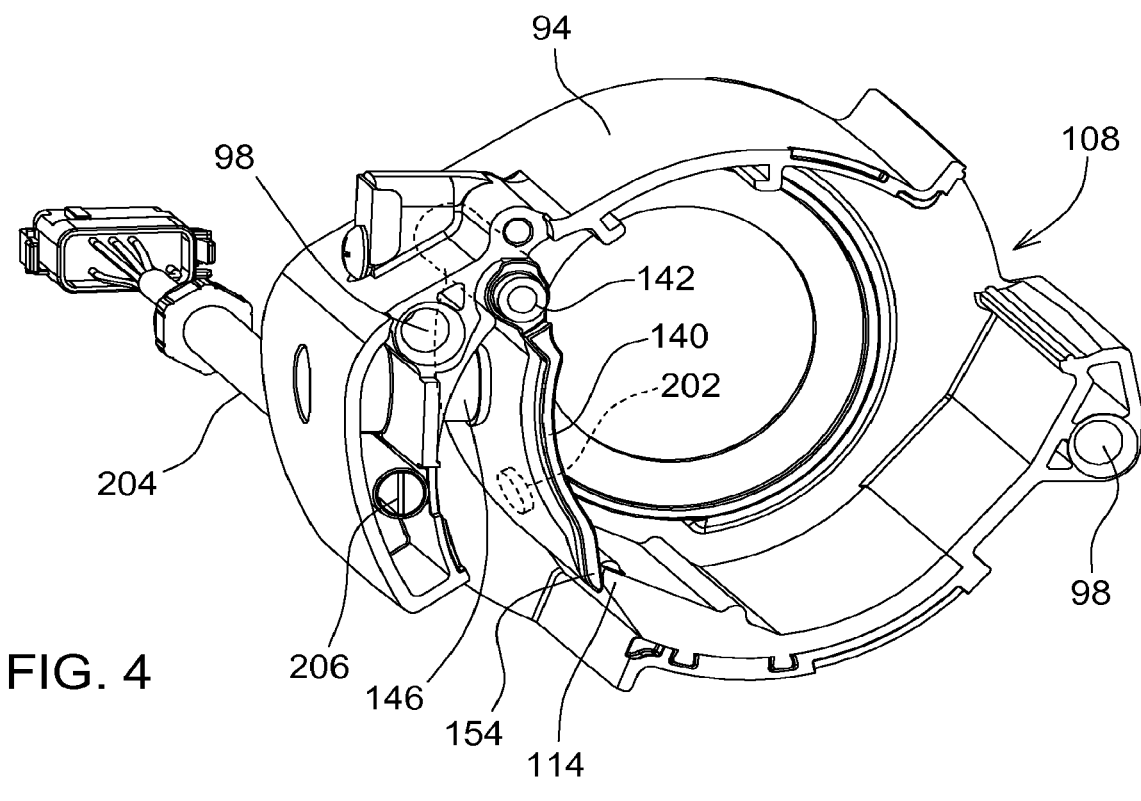
FIG. 4 is a perspective view of the seed meter casing illustrating the gate in the closed position.
Figure 5:
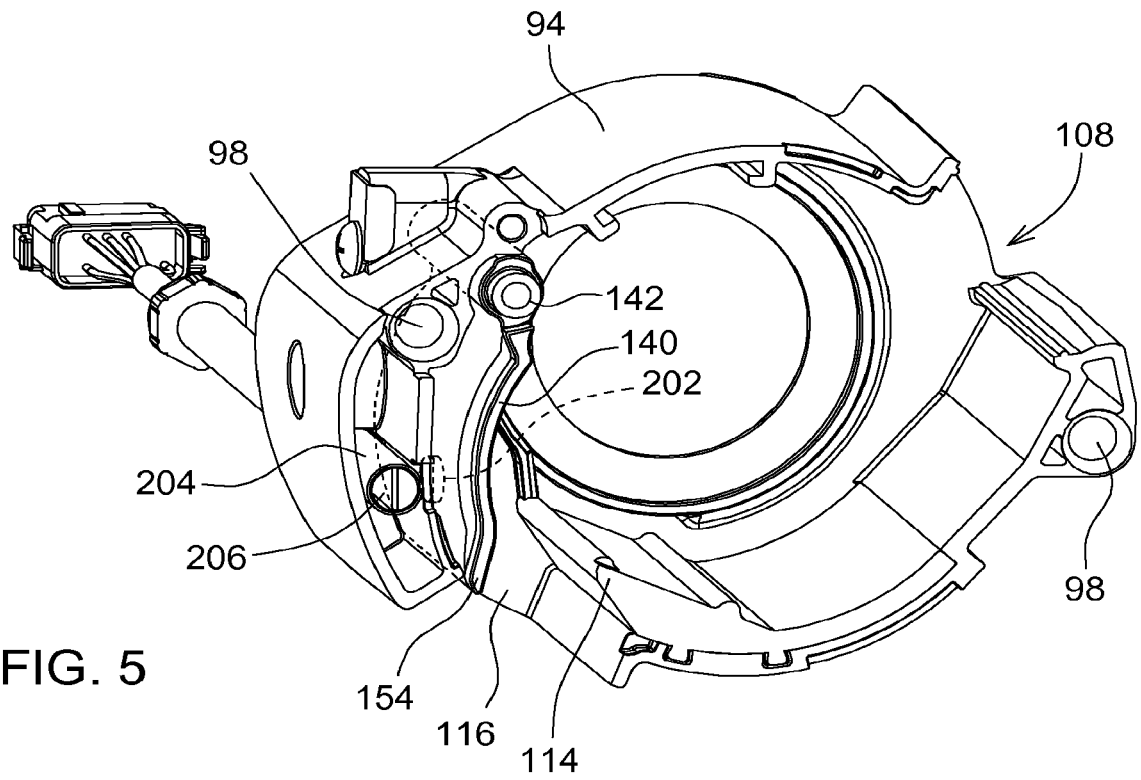
FIG. 5 is a perspective view of the seed meter casing shown in FIG. 4 illustrating the gate in the open position.
Figure 6:
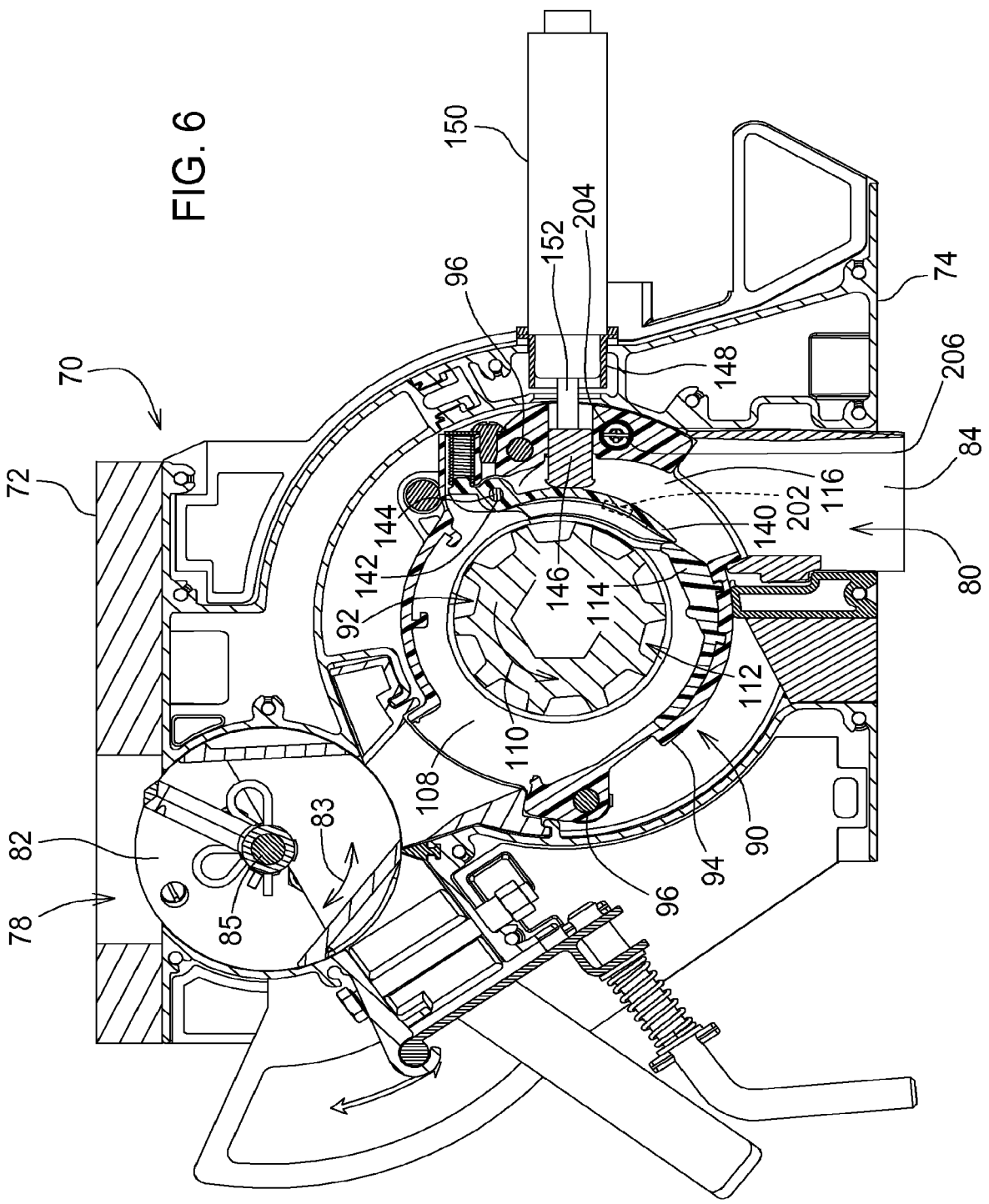
FIG. 6 is a side sectional view of the seed meter of the air seeder shown in FIG. 1.

With reference to FIGS. 4-6, each meter casing 94 has a control member in the form of a shut-off gate 140. Each control member is movable between an open position and a closed position. In the open position the control member allows flow of product through the meter housing 70 and into the associated product flow passage 138. In the closed position, the control member stops flow of product in the product flow passages. In the embodiment shown, a shut-off gate 140 in FIG. 4 is shown in the closed position preventing product from flowing over the ledge 114. The shut-off gate 140 is pivotally mounted to the meter casing at pivot 142 near a proximal end of the gate. Each gate 140 is held in the closed position by a plunger 146 that is moved within a sleeve 148 in the meter casing 94. Actuators 150 are mounted to the meter housing 70. Each actuator 150 has an extendable rod 152 that extends into the sleeve 148 and bears against the plunger 146 as shown in FIG. 6 when the actuator is in the energized state. While the shut-off gate 140 is shown as a pivoting gate, it will be appreciated that the shut=off gate could mounted for sliding or other types of movement between the closed and open positions. The claims that follow are not limited to the particular form of motion of the shut-off gate or control member.

A meter casing and shut-off gate are shown in greater detail in FIGS. 4 and 5. In FIG. 4 the gate 140 is shown in the closed position in which a distal end 154 of the gate bears against or is adjacent the ledge 114 to prevent product from flowing over the ledge. In FIG. 5, the gate is shown in the open position, spaced from the ledge 114, allowing product to flow over the ledge to the outlet passage 80. The gate 140 is biased by a spring mechanism, not shown, to the open position so that in a failure mode of the actuators 150, the machine can still be used to distribute product only without the ability to stop sections of the meter to avoid product overlap. More details of the gate structure and the actuators can be found at U.S. Pat. No. 8,678,347, incorporated herein by reference.

The gate 140 is operable to stop flow of the product by blocking the meter casing outlet. Other mechanisms for doing the same are described in U.S. Pat. Nos. 8,132,521 and 8,281,724 which show other gate mechanisms for closing the meter outlet, both of which are incorporated herein by reference. Product flow can also be stopped by blocking the flow of product into the meter as described in U.S. Pat. No. 7,690,440 also incorporated herein by reference. Product flow can further be stopped by stopping the rotation of one or more meter roller segments 100. A device for doing so is shown in U.S. Pat. No. 8,196,534 incorporated herein by reference. Other means may be used to disconnect sections of a meter roller from the drive. One example of this is the Zone Command and Auto Zone Command™ available from Seed Master of Emerald Park, Saskatchewan, Canada, which uses an air cylinder to disengage gears on the metering rollers to stop and start the product flow. Product flow through the product flow passages can also be stopped by control means located in the product flow passages downstream of the meter. For example, U.S. Pat. No. 7,555,990, incorporated herein by reference, shows valves diverting the flow of product from the secondary distribution lines 58 to stop the product flow. All of the above mechanisisms include a control member that is movable between open and closed positions to either allow or stop flow of product to the product flow passages.

During operation of the implement 10, it is important to know that the control member or gate 140 is in the proper position. If the control member is in its closed position when it is supposed to be open, an area of a field will not be covered or planted with seed. Conversely, if the control member is in the open position when it is commanded to be closed, there will be wasted product. Seed Hawk, of Langbank, Saskatchewan makes an air cart embodying the device shown in U.S. Pat. No. 7,690,440. To monitor the location of the shut off gates, a sensor is placed on the gate actuator to monitor the position of the actuator. While this is helpful, it does not work properly to inform the operator of the control member position in the event of a failure of the connection between the actuator and the control member.

A monitoring system is provided to overcome this problem by directly sensing the position of the control member, such as the gate 140. By "directly" sensing the control member position, it is meant that the position of the control member itself is sensed, not the position of the actuator or linkage connected between the control member and the actuator. Thus, regardless of any failure of the actuator or linkage, the operator is always informed concerning the actual position of the control member.

In the device shown in the Figures, the control member position sensing is accomplished with the use of proximity switches associated with each control member or gate 140. A magnet 202 is affixed to or integrated into each control member. A tube 204 extends through the meter casings 94 and contains reed switches 206 for each shut-off gate 140 and magnet 202. The reed switches are a type of proximity sensor that is activated by the presence of the magnet. In this instance, the reed switch is a non-contact switch as it does not make contact with the control member. In this embodiment, when the shut-off gate 140 is in the open position, the magnet is close enough to the switch to act on the switch to close the electrical circuit. The closed circuit generates a signal to the controller 222 (see below). When the shut-off gate is in the closed position, the magnet is sufficiently far away from the reed switch that the switch remains in the open position and no signal is generated. The tube 204 contains the lead wires for multiple switches so that one switch is placed in each meter casing 94 for detecting the position of each control member or gate 140. The tube 204 encloses the reed switches and isolates the switches from the environment and from contamination from the product being distributed. The tube may be made of any suitable material that allows the magnetic field of the magnets 202 to pass into the tube. Stainless steel is one suitable material. The tube and reed switches are available from Elobau GmbH. By activating the reed switches 206 based on the position of the gates, the gate position is sensed directly instead of sensing the position of another component that is connected to the gate. This avoids any signal errors caused by mechanical failures. Other types of contact and non-contact position sensors may be used in place of the magnets and reed switch combination described here.

The direct sensing of the control member position can be done with control members at any location in the distribution system. For example, the control members maybe between the tanks and the meter to prevent product flow into the meter. In another embodiment, the control member may be a distance downstream from the meter. One option is to place the control member at a distribution manifold such as the manifold 52. In all embodiments, the claimed "product flow passage" is a passage downstream of the control member or gate 140.

Figure 10:
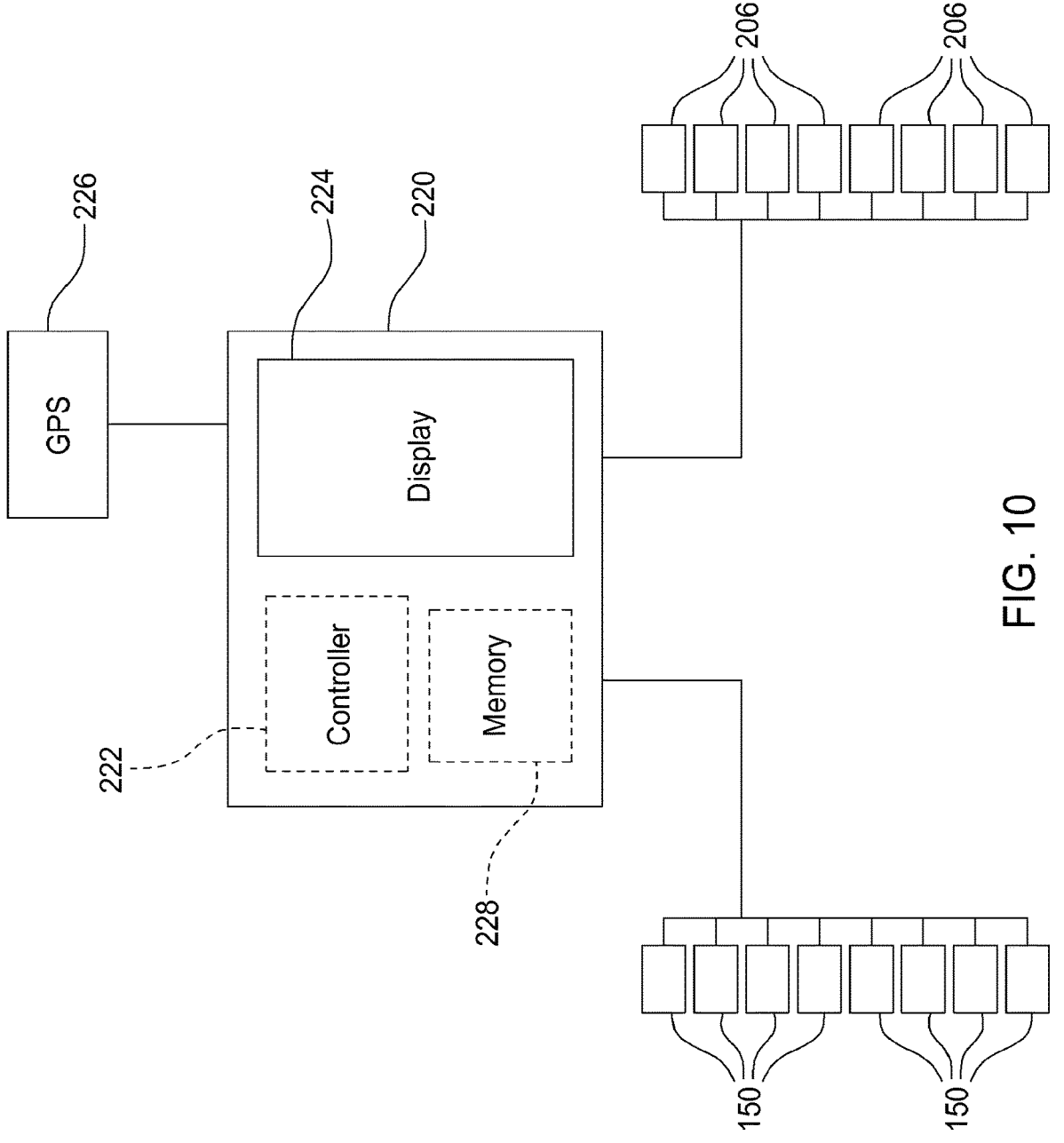
FIG. 10 is a schematic diagram of the control system for the product distribution system.

A schematic diagram of the control system is shown in FIG. 10. A monitor 220 contains a micro-processor based controller 222, a display 224 and a memory device 228. The display can be a touch screen to operate as both an output device and an input device. Other input devices may be used such as push buttons or rotary knobs. The controller is connected to the actuators 150 to command either open or closed positions for the control members. Likewise, the reed switches 206 are coupled to the controller so that the controller receives position signals from the sensors indicating the position of the control members. The display 224 is used to display an alert message to the operator if the commanded position of any control member is inconsistent with sensed position of the control member. An inconsistency can occur in two different situations. In once inconsistency, the commanded position of the flow control member is open and the sensed position is that the flow control member is closed. The second inconsistency occurs if the commanded position for a flow control member is closed and the sensed position is open. The control system can be configured to alert the operator in the event if either the first or the second inconsistencies or both. Those skilled in the art will recognize that audio or tactile alarms are also possible.

A location signal input is provided by a positioning system such as GPS 226. Any type of local or satellite positioning system can be used. The controller stores in the memory map data showing the geographic area over which product has been distributed. The map is based on the position of the device, i.e. the area over which the tool 24 has covered, and the actual sensed positions of the shut-off gates 140. This produces a more accurate coverage map than if the map is based on the commanded position of the control members since the actual position of the control members may vary from the commanded position. The schematic diagram of the control system in FIG. 10 is only illustrative of one way to construct such a system. Those skilled in the art will recognize, for example, that the various components in the monitor 220 can be separately housed and located if desired.

Having described one embodiment, it will become apparent that various modifications can be made without departing from the scope of the invention as defined in the accompanying claims.

What is claimed is:

1. A product distribution device comprising:
a container for holding a product to be distributed;
a meter assembly for controlling discharge of product from the container;
a product flow passage through which product flows downstream of the meter assembly;
a flow control system having a control member movable between an open control member position and a closed control member position, in the open control member position the control member allowing flow of product through the product flow passage and in the closed control member position the control member stopping flow of product through the product flow passage, the control member comprising a shut-off gate;
a position sensor to directly sense a control member position of the shut-off gate;
an enclosure to isolate the position sensor from the product;
a controller coupled to the flow control system to send signals to the flow control system to command an open or closed position of the control member, the controller further coupled to the position sensor to receive signals from the position sensor indicating the control member position of the control member, the controller comparing a sensed control member position with a commanded control member position and alerting an operator when the commanded control member position and the sensed control member position are inconsistent; and
a plurality of meter casings, wherein the position sensor is one of a plurality of position sensors, wherein each position sensor of the plurality of position sensors directly senses the control member position of a respective meter casing of the plurality of meter casings, and wherein each position sensor of the plurality of position sensors is mounted within the enclosure.

2. The device of claim 1 wherein the position sensor is a non-contact sensor.

3. The device of claim 2 wherein the position sensor is a proximity switch.

4. The device of claim 1 wherein the controller alerts the operator when an inconsistency in the commanded control member position and the sensed control member position occurs when the commanded control member position is open and the sensed control member position is closed.

5. The device of claim 1 wherein the controller alerts the operator when an inconsistency in the commanded control member position and the sensed control member position occurs when the commanded control member position is closed and the sensed control member position is open.

6. The device of claim 1, wherein the product flow passage is one of a plurality of product flow passages, and wherein the control member is one of a plurality of control members.

7. The device of claim 1 wherein the controller generates a map of field area over which the product distribution device has been operated and over which product has been distributed based on the sensed control member position.

8. The device of claim 1, wherein the enclosure is in a form of a tube that extends through at least one of the plurality of meter casing.

9. The device of claim 1, further comprising a magnet affixed to or integrated with the control member.

10. The device of claim 1, wherein the enclosure extends through the plurality of meter casings.

11. The device of claim 10, wherein the enclosure is in a form of a tube.

12. The device of claim 1, wherein the enclosure is in a form of a tube.

13. A product distribution device comprising:

a container for holding a product to be distributed;

a meter assembly for controlling discharge of product from the container;

a product flow passage through which product flows downstream of the meter assembly;

a flow control system having a control member movable between an open control member position and a closed control member position, in the open control member position the control member allowing flow of product through the product flow passage and in the closed control member position the control member stopping flow of product through the product flow passage, the control member comprising a shut-off gate;

a position sensor that is activated when a magnet approaches the position sensor, the position sensor sensing a control member position of the shut-off gate;

an enclosure to isolate the position sensor from the product;

a controller coupled to the flow control system to send signals to the flow control system to command an open or closed position of the control member, the controller further coupled to the position sensor to receive signals from the position sensor indicating the control member position of the control member, the controller comparing a sensed control member position with a commanded control member position and alerting an operator when the commanded control member position and the sensed control member position are inconsistent; and a plurality of meter casings, wherein the position sensor is one of a plurality of position sensors, wherein each position sensor of the plurality of position sensors senses the control member position of a respective meter casing of the plurality of meter casings, and wherein each position sensor of the plurality of position sensors is mounted within the enclosure.

14. The device of claim 13, wherein the magnet is affixed to the shut-off gate.

* * * * *